J. SMOLAREK.
SAFETY GAS VALVE.
APPLICATION FILED AUG. 7, 1915.

1,178,422.

Patented Apr. 4, 1916.
2 SHEETS—SHEET 1.

Witnesses:
C. Peinle Jr.
C. C. Hines

Inventor,
Joseph Smolarek.
By Victor J. Evans,
Attorney.

J. SMOLAREK.
SAFETY GAS VALVE.
APPLICATION FILED AUG. 7, 1915.

1,178,422.

Patented Apr. 4, 1916.
2 SHEETS—SHEET 2.

Inventor,
Joseph Smolarek.

Witnesses:
C. Peinle, Jr.
C. L. Hines.

By Victor J. Evans,
Attorney.

UNITED STATES PATENT OFFICE.

JOSEPH SMOLAREK, OF STRUTHERS, OHIO.

SAFETY GAS-VALVE.

1,178,422. Specification of Letters Patent. Patented Apr. 4, 1916.

Application filed August 7, 1915. Serial No. 44,227.

*To all whom it may concern:*

Be it known that I, JOSEPH SMOLAREK, a citizen of the United States, residing at Struthers, in the county of Mahoning and State of Ohio, have invented new and useful Improvements in Safety Gas-Valves, of which the following is a specification.

My invention relates to safety gas valves, and one of its objects is to provide a valve which in the event of an undue reduction of pressure in the main, will automatically close and thus prevent the inflow of gas through open burners into a building upon the resumption of normal pressure in the main.

A further object of the invention is to provide a valve which may be manually closed and locked in closed position in the event of the building catching fire, and which, when automatically closed, cannot be reset for operation until manually reopened.

A still further object of the invention is to provide a valve which will close automatically under the action of heat upon a conflagration breaking out, and which may also be closed by manually disrupting a part thereof under such conditions.

The invention consists of the features of construction, combination and arrangement of parts herein fully described and claimed, reference being had to the accompanying drawings in which:—

Figure 1:
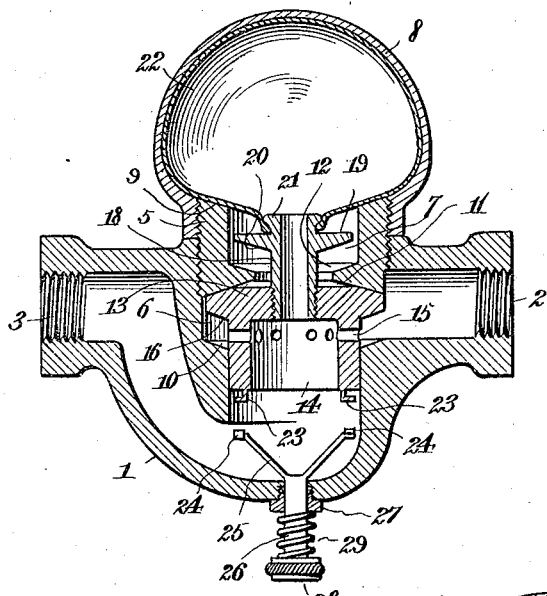
Figure 2:
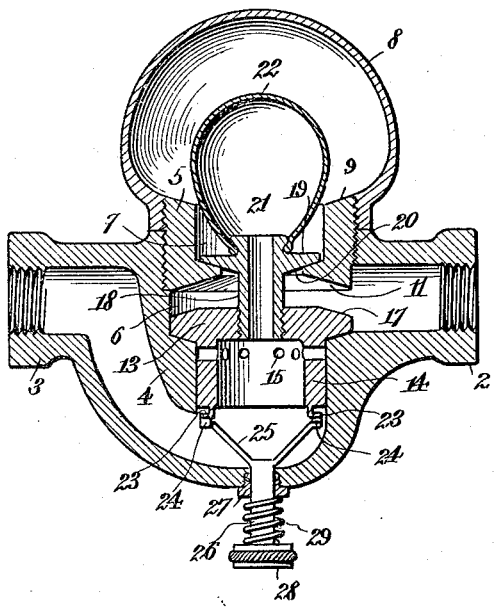
Figure 3:
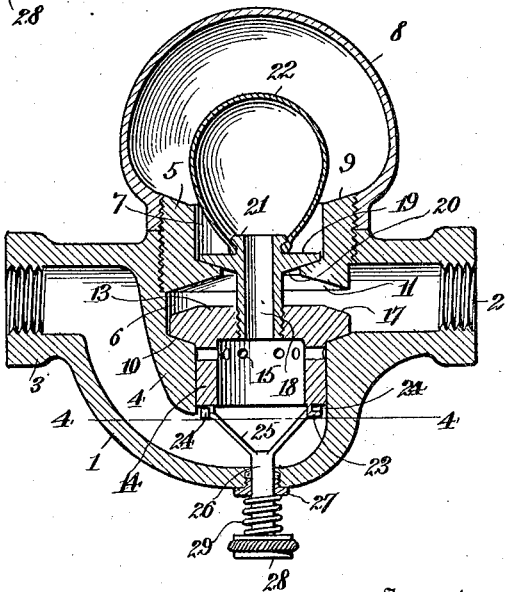
Figure 4:
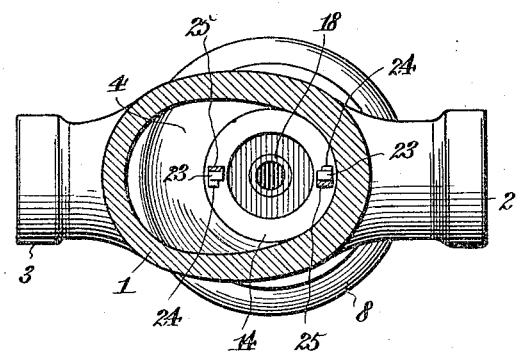
Figure 5:
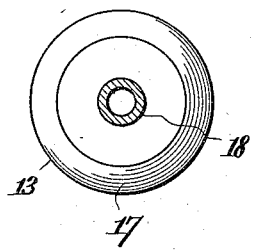
Figure 6:
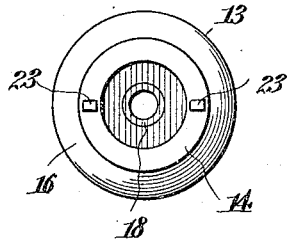
Figure 7:
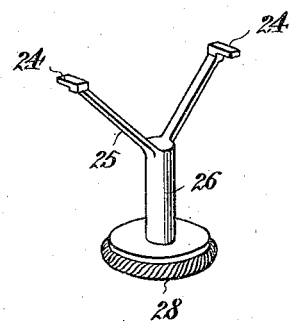

Figure 1 is a vertical longitudinal section through the valve showing the same open for the passage of gas therethrough. Fig. 2 is a similar view showing the valve in closed position. Fig. 3 is a similar view showing the valve closed and locked. Fig. 4 is a section on line 4—4 of Fig. 3. Fig. 5 is a horizontal transverse section through the valve *per se*. Fig. 6 is a bottom plan view of the valve *per se*. Fig. 7 is a detail view of the valve raising and locking device.

Referring to the drawings, 1 designates the valve casing having at one side an inlet 2 and at the opposite side an outlet 3, said inlet and outlet being internally threaded for connection with the proximate ends of a gas service pipe in the line of connection between the main and burners of a building. The casing is also provided with a partition 4 and upstanding neck 5 arranged to provide lower and upper main and auxiliary valve chambers 6 and 7. The neck portion 5 is externally threaded to receive a partially spherical cap or bonnet 8 forming an expansion chamber. The upper surface of the neck portion 5 is curved to form a concaved seat 9, which partakes of the spherical curvature of the internal wall of the cap and the function of which will be hereinafter described.

The chamber 7 forms a passage between the chamber 6 and the chamber 8, and the said chamber 6 communicates at one side with the inlet 2 and at its base or lower portions with the outlet 3. The walls of these chambers 6 and 7 are formed to provide beveled valve seats 10, 11 and 12, the valve seats 10 and 11 being arranged at the lower and upper portions of the chamber 6, and the valve seat 12 at the lower portion of the chamber 7.

A duplex valve device is provided for controlling communication between the inlet, outlet and expansion chamber, and this valve device comprises a disk-like body 13 having a depending tubular portion 14 provided with ports 15. This tubular portion 14 is movable between the lower portion of the partition 4 and the wall of the valve casing below the inlet 2, and forms with the body 13 a double acting valve, as hereinafter described. The body 13 projects marginally beyond the tubular portion 14 and has a beveled lower face 16 to engage the seat 10 and a beveled upper face 17 to engage the seat 11.

A conducting tube 18 rises from the body portion 13 and communicates at its lower end with the interior of the tubular portion 14, and the upper end of this tube carries an auxiliary valve member 19 provided with a beveled surface 20 to engage the seat 12, the extremity of the tube terminating in a nipple 21. Secured to the nipple 21 is an expansion bulb 22 which is designed to be expanded by gas pressure. This bulb is made of some highly elastic material, such as pure rubber, of a desired thickness to withstand the pressure to be sustained thereby, while the cap 8 which serves as a shell or protecting casing therefor is made of some suitable soft, fusible metal, such as lead, which may be easily broken or fractured and which at the same time will melt or be fused at a comparatively low degree of heat under normal atmospheric temperature.

Arranged upon the underside of the tubular portion 14 of the valve are projections 23 which are adapted to be engaged by locking members 24 upon the branching arms of a Y-shaped valve lifting and manipulating member 25, which is provided with a stem 26 passing outwardly at the base of the valve casing through a stuffing box 27, in which it is slidably and rotatably mounted, said stem being provided with a knob or finger piece 28 and acted upon by a coiled spring 29, by which said valve manipulating and locking device is normally held retracted.

In setting the valve for action, a valve member is raised by pushing upwardly on the valve manipulating and locking device, until the valve member assumes the position shown in Fig. 1, in which it has been lifted off the seat 10 and raised into engagement with the seat 11, thus bringing the ports 15 into register with the inlet 2 for the flow of gas to the outlet 3 via said ports and the tube body 14. A portion of this gas will also flow upward through the tube 18 into the elastic bulb 22, which will extend under the pressure of the gas until, when at maximum pressure, it fills the expansion chamber 8 and rests snugly against the seat 9, by which the bulb serves as a support to hold the valve in open position as long as the working gas pressure is maintained, and at the same time serves to prevent any leakage of gas around the surface 9 and between it, the bulb, and the bottom of the chamber 8. This condition will be obtained as long as the gas is flowing or maintained under normal service pressure, or does not descend to any material degree below such pressure. If, however, the pressure should descend to an abnormal degree in the main, the bulb 22 will collapse and allow the valve to descend under its own weight by gravity to the closed position shown in Fig. 3, in which the valve member 13 engages the seat 10 and the valve member 19 engages the seat 12, the ports 15 being brought to a position below and out of register with the inlet 2, whereby the flow of gas between the inlet and the outlet will be cut off and gas prevented from flowing from the inlet to the expansion chamber 8. The valve will remain closed in this position, notwithstanding the fact that there may be a resumption of normal pressure in the main, until it is again lifted manually in the manner described and thereby reset to establish communication between the main and the house service system, by which any passage of gas through open burners into the house will be prevented.

Whenever it is desired to cut off communication between the main and house service system when the pressure is normal, this may be accomplished by pushing upward on the valve manipulating and locking device and giving it a partial revolution to bring its engaging fingers 24 into position with the lugs or projections 23 on the valve, thus positively connecting the valve manipulating and locking device with the valve, allowing the valve to be pulled downwardly against the resistance of the expanded bulb, in which operation the bulb is collapsed, whereby the valve may be held locked against any pressure in the main until it is manually released to again restore communication between the main and the house service system.

It will thus be seen that my invention provides a type of valve or cut-off which is simple of construction, reliable and efficient in operation, adapted to be held open under normal pressure and to close positively under an abnormally decreased pressure, and which when closed will be maintained in closed position until it is positively set for operation again by manual manipulation. Furthermore, it will be seen that the valve may be closed and thrown out of operation and locked in such position at any time under any condition of service of the supply system. If a fire should break out in a house, the service system of which is equipped with my invention, the valve may be instantly thrown out of operation without manipulating the manipulating and locking device by simply fracturing the cap or casing 8 and puncturing the bulb 22, which may be performed by any suitable type of implement, whereupon the valve will automatically close in an obvious manner. The cap 8 is also adapted to melt or fuse under such condition at a temperature above normal, so that the flames will burn or the heat explode the bulb 22, whereupon the valve will automatically close and cut off the supply of gas to the house, it being understood that the valve is arranged at any suitable point upon the exterior of the building. If desired, the cap may be made of glass or porcelain, rendering it both frangible under the action of blows or heat and fusible at a certain high degree of heat, as will be readily understood.

It will be seen from the foregoing description that the valve is simple of construction, that it will operate under very low pressure, and that there are no resistance devices tending to interfere with the operation of the valve when working with low pressure. In a large majority of the safety gas valves commonly employed comparatively heavy resistance devices in the form of springs, diaphragms or weights are employed, and the use of these resistance devices makes it impossible to operate the valve at low pressure, especially in the use of a valve of comparatively small size, as with my construction. My invention avoids all complications and provides a valve which will operate equally well at high or low pressure.

I claim:—

1. A pressure controlled valve comprising a casing having an inlet, an outlet, and a pressure chamber, and a gravity valve having a portion for establishing communication between the inlet and outlet when the valve is in open position, and having a portion for closing communication between the inlet and pressure chamber when the valve is in closed position, and an expansion bulb within the pressure chamber and in normal communication with the inlet through said valve portions, said bulb being adapted for engagement with a portion of the casing to support the valve in open position when said bulb is fully expanded.

2. A pressure controlled valve comprising a casing having an inlet, an outlet, and a pressure chamber provided with a seat surface, a gravity valve comprising a body provided with a depending tubular portion having ports for establishing communication between the inlet and outlet when the valve is raised to open position, said valve being provided with a tubular portion having an auxiliary valve for closing communication between the inlet and pressure chamber when the valve is closed, and an expansion bulb connected with said tubular portion and adapted to be expanded within the expansion chamber and to rest upon the seat surface therein to support the valve in open position.

3. A valve comprising a casing having an inlet, an outlet and an expansion chamber, a valve controlling communication between the inlet and outlet and provided with projections, an expansible bulb within the expansion chamber and in communication through the valve with the outlet and adapted to be expanded in said chamber by the pressure of the gas in the main to support the valve in open position, and a spring controlled sliding and rotary valve manipulating and locking device having members to engage the projections on the valve whereby the latter may be drawn down to closed position and locked in such position.

In testimony whereof I affix my signature in presence of two witnesses.

JOSEPH SMOLAREK.

Witnesses:
JOHN SMOLAREK,
JOHN YALSICK.

Copies of this patent may be obtained for five cents each, by addressing the "Commissioner of Patents, Washington, D. C."